(12) United States Patent
Park et al.

(10) Patent No.: US 8,774,270 B2
(45) Date of Patent: Jul. 8, 2014

(54) METHOD AND APPARATUS FOR GENERATING VIDEO PACKET

(75) Inventors: Sung-bum Park, Seongnam-si (KR); Jae-won Yoon, Seoul (KR); Hae-young Jun, Seoul (KR); Jung-woo Kim, Suwon-si (KR); Dai-woong Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 343 days.

(21) Appl. No.: 13/038,884

(22) Filed: Mar. 2, 2011

(65) Prior Publication Data

US 2011/0216784 A1 Sep. 8, 2011

Related U.S. Application Data

(60) Provisional application No. 61/309,521, filed on Mar. 2, 2010.

(30) Foreign Application Priority Data

Oct. 29, 2010 (KR) ........................ 10-2010-0107016

(51) Int. Cl.
 *H04N 11/02* (2006.01)
(52) U.S. Cl.
 USPC .................................................. 375/240.08
(58) Field of Classification Search
 USPC .............. 375/240, 240.01, 240.02, 240.08, 375/240.12, 240.16, 240.18, 240.19, 375/240.22, 240.24
 See application file for complete search history.

(56) References Cited

U.S. PATENT DOCUMENTS

| 6,961,063 | B1 | 11/2005 | Kuriakin et al. |
| 6,999,088 | B1 * | 2/2006 | Van Dyke et al. ............. 345/544 |
| 7,359,560 | B2 * | 4/2008 | Mossakowski ............... 382/240 |
| 2003/0198293 | A1 * | 10/2003 | Chen et al. ............... 375/240.16 |
| 2006/0083310 | A1 * | 4/2006 | Zhang ....................... 375/240.16 |
| 2007/0189383 | A1 | 8/2007 | Shao et al. |
| 2007/0202843 | A1 | 8/2007 | Niu et al. |

OTHER PUBLICATIONS

International Search Report dated Nov. 14, 2011 in counterpart international application No. PCT/KR2011/001430.
Notification of Transmittal of the International Search Report and the Written Opinion of the International Searching Authority dated Nov. 14, 2011 in counterpart international application No. PCT/KR2011/001430.
Written Opinion of the International Searching Authority dated Nov. 14, 2011 in counterpart international application No. PCT/KR2011/001430.

* cited by examiner

*Primary Examiner* — Edan Orgad
*Assistant Examiner* — Curtis A Alia
(74) *Attorney, Agent, or Firm* — Sughrue Mion, PLLC (57) ABSTRACT

Methods and apparatuses for generating video packets are provided. A method of generating a video packet includes generating at least one pixel block including at least one reference pixel and at least one neighboring pixel adjacent to the at least one reference pixel from pixels of a video frame; replacing a pixel value of the at least one neighboring pixel in the at least one pixel block with a pixel difference value, which is a difference value between a pixel value of a pixel adjacent to the at least one neighboring pixel and the pixel value of the at least one neighboring pixel; and generating packets so that a pixel value of the at least one reference pixel and the pixel difference value of the at least one neighboring pixel are allocated to different packets according to positions of the pixels.

23 Claims, 7 Drawing Sheets

```
START
  ↓
GENERATE AT LEAST ONE PIXEL BLOCK CONSISTING OF
AT LEAST ONE REFERENCE PIXEL AND AT LEAST ONE      — 310
NEIGHBORING PIXEL ADJACENT TO AT LEAST ONE
REFERENCE PIXEL FROM PIXELS OF VIDEO FRAME
  ↓
REPLACE PIXEL VALUE OF AT LEAST ONE
NEIGHBORING PIXEL IN AT LEAST ONE PIXEL BLOCK      — 320
WITH PIXEL DIFFERENCE VALUE
  ↓
GENERATE PACKETS SO THAT BITS INDICATING PIXEL
VALUE OF AT LEAST ONE REFERENCE PIXEL AND PIXEL
DIFFERENCE VALUE OF AT LEAST ONE NEIGHBORING       — 330
PIXEL ARE ALLOCATED TO DIFFERENT
PACKETS ACCORDING TO LEVELS OF BITS
  ↓
END
```

FIG. 4

| | Sign | $b_7$ | $b_6$ | $b_5$ | $b_4$ | $b_3$ | $b_2$ | $b_1$ | $b_0$ |
|---|---|---|---|---|---|---|---|---|---|
| 45 | 0 | 0 | 0 | 1 | 0 | 1 | 1 | 0 | 1 |
| −74 | 1 | 0 | 1 | 0 | 0 | 1 | 0 | 1 | 0 |
| 21 | 0 | 0 | 0 | 0 | 1 | 0 | 1 | 0 | 1 |
| 14 | 0 | 0 | 0 | 0 | 0 | 1 | 1 | 1 | 0 |
| −4 | 1 | 0 | 0 | 0 | 0 | 0 | 1 | 0 | 0 |
| −18 | 1 | 0 | 0 | 0 | 1 | 0 | 0 | 1 | 0 |
| 4 | 0 | 0 | 0 | 0 | 0 | 0 | 1 | 0 | 0 |
| 1 | 1 | 0 | 0 | 0 | 0 | 0 | 0 | 0 | 1 |

METHOD AND APPARATUS FOR GENERATING VIDEO PACKET

CROSS-REFERENCE TO RELATED PATENT APPLICATION

This application claims priority from U.S. Provisional Patent Application No. 61/309,521, filed on Mar. 2, 2010 in the U.S. Patent and Trademark Office, and priority from Korean Patent Application No. 10-2010-0107016, filed on Oct. 29, 2010 in the Korean Intellectual Property Office, the disclosures of which are incorporated herein by reference in their entirety.

BACKGROUND

1. Field

Methods and apparatus consistent with exemplary embodiments relate to a method and apparatus for generating a video packet.

2. Description of the Related Art

Computer technologies and wired and wireless communication technologies have rapidly developed to increase the quality of digital video content. Applications and programs for reproducing high quality digital video content have been additionally proposed for wired and wireless communication systems, and accordingly, demands for a high quality digital video content service are increasing.

However, since a bandwidth of a network for transmitting video content is limited, a method of efficiently transmitting high-volume video content is required.

SUMMARY

Exemplary embodiments provide a method and apparatus for generating a video packet. One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a method of generating a video packet, the method including: generating at least one pixel block including at least one reference pixel and at least one neighboring pixel adjacent to the at least one reference pixel from among a plurality of pixels of a video frame; replacing a pixel value of the at least one neighboring pixel in the at least one pixel block with a pixel difference value, which is a difference value between a pixel value of a pixel adjacent to the at least one neighboring pixel and the pixel value of the at least one neighboring pixel; and generating a plurality of packets so that a pixel value of the at least one reference pixel and the pixel difference value of the at least one neighboring pixel are allocated to different packets among the plurality of packets according to positions of the at least one reference pixel and the at least one neighboring pixel within the at least one pixel block.

The generating of the packets may further include generating sub-packets so that bits respectively indicating the pixel value of the at least one reference pixel and the pixel difference value of the at least one neighboring pixel, which are respectively included in the packets, are allocated to different packets according to a level of the bits.

The method may further include performing entropy coding of at least one packet including the pixel difference value of the at least one neighboring pixel from among the generated packets.

The generating of the packets may include generating packets to which unequal error protection is applied according to an importance of the packets.

The generating of the packets may include generating the packets in an order of importance of the packets.

The method may further include determining a size of the at least one pixel block, wherein the at least one pixel block is generated based on the pixel block size.

The method may further include generating a plurality of slices having a predetermined size by dividing the video frame in a slice unit, wherein the generating of the at least one pixel block is performed for pixels in the plurality of slices.

According to an aspect of another exemplary embodiment, there is provided a method of generating a video packet, the method including: generating at least one pixel block including at least one reference pixel and at least one neighboring pixel adjacent to the at least one reference pixel from pixels of a video frame; replacing a pixel value of the at least one neighboring pixel in the at least one pixel block with a pixel difference value, which is a difference value between a pixel value of a pixel adjacent to the at least one neighboring pixel and the pixel value of the at least one neighboring pixel; and generating packets so that bits respectively indicating a pixel value of the at least one reference pixel and the pixel difference value of the at least one neighboring pixel are allocated to different packets according to a level of the bits.

According to an aspect of another exemplary embodiment, there is provided a method of generating a video packet, the method including: sampling pixel values of pixels in a video frame based on color components; and generating packets so that the sampled pixel values are allocated to different packets based on the color components.

According to an aspect of another exemplary embodiment, there is provided an apparatus which generates a video packet, the apparatus including: a pixel block generator for generating at least one pixel block including at least one reference pixel and at least one neighboring pixel adjacent to the at least one reference pixel from pixels of a video frame; a pixel value management unit which replaces a pixel value of the at least one neighboring pixel in the at least one pixel block with a pixel difference value, which is a difference value between a pixel value of a pixel adjacent to the at least one neighboring pixel and the pixel value of the at least one neighboring pixel; and a packet generator which generates packets so that a pixel value of the at least one reference pixel and the pixel difference value of the at least one neighboring pixel are allocated to different packets according to positions of the pixels.

The apparatus may further include a coder for performing entropy coding of at least one packet including the pixel difference value of the at least one neighboring pixel from among the generated packets.

According to an aspect of another exemplary embodiment, there is provided an apparatus for generating a video packet, the apparatus including: a pixel block generator which generates at least one pixel block including at least one reference pixel and at least one neighboring pixel adjacent to the at least one reference pixel from pixels of a video frame; a pixel value management unit which replaces a pixel value of the at least one neighboring pixel in the at least one pixel block with a pixel difference value, which is a difference value between a pixel value of a pixel adjacent to the at least one neighboring pixel and the pixel value of the at least one neighboring pixel; and a packet generator which generates packets so that bits respectively indicating a pixel value of the at least one reference pixel and the pixel difference value of the at least one neighboring pixel are allocated to different packets according to a level of the bits.

According to an aspect of another exemplary embodiment, there is provided an apparatus which generates a video packet, the apparatus including: a sampling unit which samples pixel values of pixels in a video frame based on color components; and a packet generator which generates packets so that the sampled pixel values are allocated to different packets based on color components.

According to an aspect of another exemplary embodiment, there is provided a computer-readable recording medium storing a computer-readable program for executing a method of generating a video packet, the method including: generating at least one pixel block including at least one reference pixel and at least one neighboring pixel adjacent to the at least one reference pixel from pixels of a video frame; replacing a pixel value of the at least one neighboring pixel in the at least one pixel block with a pixel difference value, which is a difference value between a pixel value of a pixel adjacent to the at least one neighboring pixel and the pixel value of the at least one neighboring pixel; and generating packets so that a pixel value of the at least one reference pixel and the pixel difference value of the at least one neighboring pixel are allocated to different packets according to positions of the pixels.

According to an aspect of another exemplary embodiment, there is provided a computer-readable recording medium storing a computer-readable program for executing a method of generating a video packet, the method including: generating at least one pixel block including at least one reference pixel and at least one neighboring pixel adjacent to the at least one reference pixel from pixels of a video frame; replacing a pixel value of the at least one neighboring pixel in the at least one pixel block with a pixel difference value, which is a difference value between a pixel value of a pixel adjacent to the at least one neighboring pixel and the pixel value of the at least one neighboring pixel; and generating packets so that bits respectively indicating a pixel value of the at least one reference pixel and the pixel difference value of the at least one neighboring pixel are allocated to different packets according to a level of the bits.

According to an aspect of another exemplary embodiment, there is provided a computer-readable recording medium storing a computer-readable program for executing a method of generating a video packet, the method including: sampling pixels values of pixels in a video frame based on color components; and generating packets so that the sampled pixel values are allocated to different packets based on color components.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE EXEMPLARY EMBODIMENTS

The exemplary embodiments will now be described more fully with reference to the accompanying drawings, in which the exemplary embodiments are shown.

Figure 1:
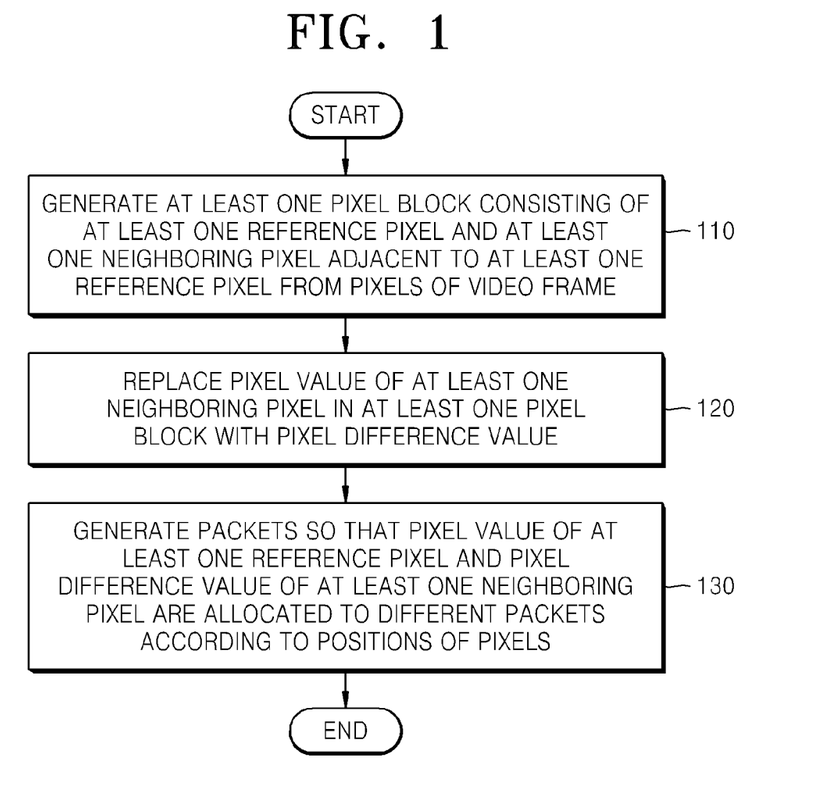
FIG. 1 is a flowchart of a method of generating a video packet according to an exemplary embodiment.

FIG. 1 is a flowchart of a method of generating a video packet according to an exemplary embodiment.

In operation 110, at least one pixel block consisting of at least one reference pixel and at least one neighboring pixel adjacent to the at least one reference pixel is generated from pixels of a video frame.

A reference pixel is only one pixel existing per pixel block and is a pixel first referred to when calculating a difference value between pixel values of two pixels in each pixel block.

According to another exemplary embodiment, the method of generating a video packet may further include determining a size of a pixel block before performing operation 110, and in operation 110, the at least one pixel block may be generated based on the determined pixel block size.

For example, the pixel block size may be determined as 1 pixel×2 pixels, 2 pixels×2 pixels, 2 pixels×4 pixels, 4 pixels×4 pixels, 4 pixels×8 pixels, 8 pixels×8 pixels, etc.

A method of generating the at least one pixel block according to an exemplary embodiment will be described later with reference to FIGS. 2A to 2F.

According to another exemplary embodiment, the method of generating a video packet may further include generating a plurality of slices by dividing a video frame in a slice unit having a predetermined size before performing operation 110, and in operation 110, the at least one pixel block may be generated from pixels of each of the plurality of slices.

In operation 120, a pixel value of the at least one neighboring pixel in the at least one pixel block is replaced with a pixel difference value, which is a difference value between a pixel value of one of the pixels adjacent to the at least one neighboring pixel and the pixel value of the at least one neighboring pixel.

For example, if it is assumed that a pixel value of a reference pixel is 50 and a pixel value of a neighboring pixel adjacently located at the right of the reference pixel is 52, a difference value between the pixel value of the reference pixel and the pixel value of the neighboring pixel adjacently located at the right of the reference pixel is +2, and finally, the pixel value of the neighboring pixel adjacently located at the right of the reference pixel is replaced with +2.

In operation 130, packets are generated so that a pixel value of the at least one reference pixel and the pixel difference value of the at least one neighboring pixel are allocated to different packets according to the positions of the pixels within the pixel block.

For example, a pixel value of a reference pixel may be included in a first packet, a pixel difference value of a neighboring pixel adjacently located at the right of the reference pixel may be included in a second packet, and a pixel difference value of a neighboring pixel adjacently located below the reference pixel may be included in a third packet. If a receiver receives these three packets, after an original pixel value of the neighboring pixels are restored based on the pixel value of the reference pixel included in the first packet and the pixel difference values of the neighboring pixels included in the second and third packets, a video frame may be restored based on the restored pixel values of the neighboring pixels and the pixel value of the reference pixel.

According to an exemplary embodiment, by allocating pixels included in a video frame to different packets according to positions of the pixels in at least one pixel block and generating the packets, even video content having a large volume can be transmitted in a format of packets having a small volume. Through this, a streaming service of high image quality video content having a large volume can be provided even through a network having a narrow bandwidth.

According to another exemplary embodiment, entropy coding may be further performed for packets including pixel difference values of neighboring pixels. Through this, a volume of the packets may be reduced. If a receiver receives packets to which the entropy coding is applied, the receiver may restore the pixel difference values of the neighboring pixels by performing entropy decoding of the packets. Here, the entropy coding may be performed based on a Huffman look-up table or an exponential golomb look-up table.

Since the entropy coding and decoding are technologies well known to those of ordinary skill in the art, an entropy coding and decoding method is omitted herein.

FIGS. 2A to 2F are diagrams for describing pixel blocks according to an exemplary embodiment.

Figure 2A:
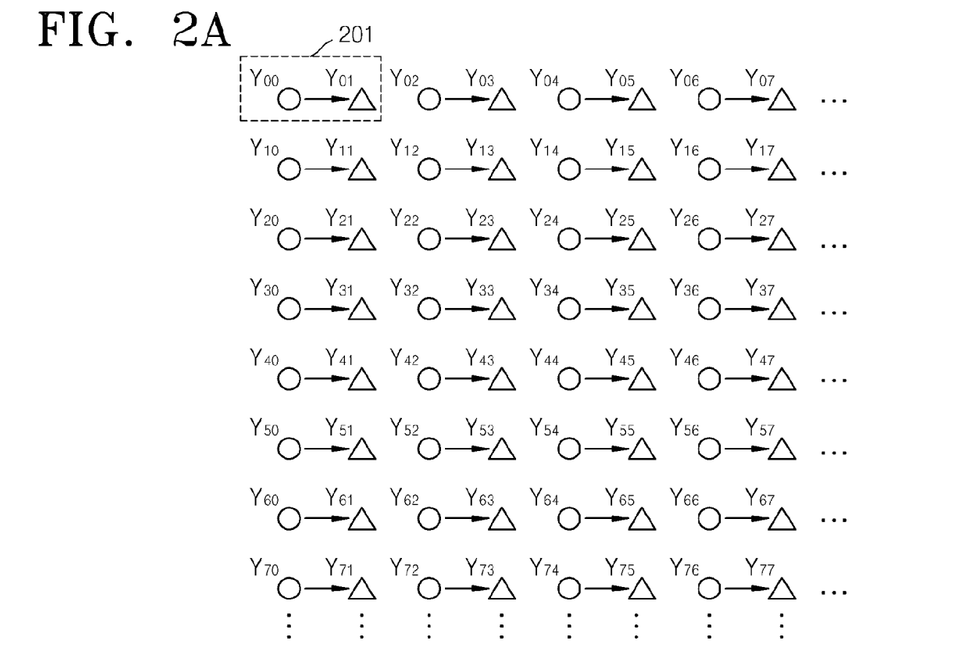
FIGS. 2A to 2F are diagrams for describing pixel blocks according to an exemplary embodiment.

FIG. 2A shows 32 pixel blocks, each pixel block having a size of 1 pixel×2 pixels.

For a pixel block 201 located at the left uppermost corner, Y00 indicated by a circle denotes a reference pixel, and Y01 indicated by a triangle denotes a neighboring pixel. An arrow marked in a direction from Y00 to Y01 indicates that a pixel value of the neighboring pixel Y01 is replaced with a difference value between a pixel value of Y00 and the pixel value of Y01.

In the embodiment of FIG. 2A, pixel values of reference pixels Y00, Y02, Y04, Y06, . . . , Y76, . . . may be included in a first packet, and pixel difference values of neighboring pixels Y01, Y03, Y05, Y07, . . . , Y77, . . . may be included in a second packet. That is, pixel values or pixel difference values of pixels in similar positions with respect to reference pixels within the pixel blocks are included in a same packet, whereas pixel values or pixel difference values of pixels in different positions with respect to the reference pixels within the pixel blocks are included in different packets. Furthermore, each pixel of a same pixel block is represented in a different packet by either a pixel value or a pixel difference value.

Figure 2B:
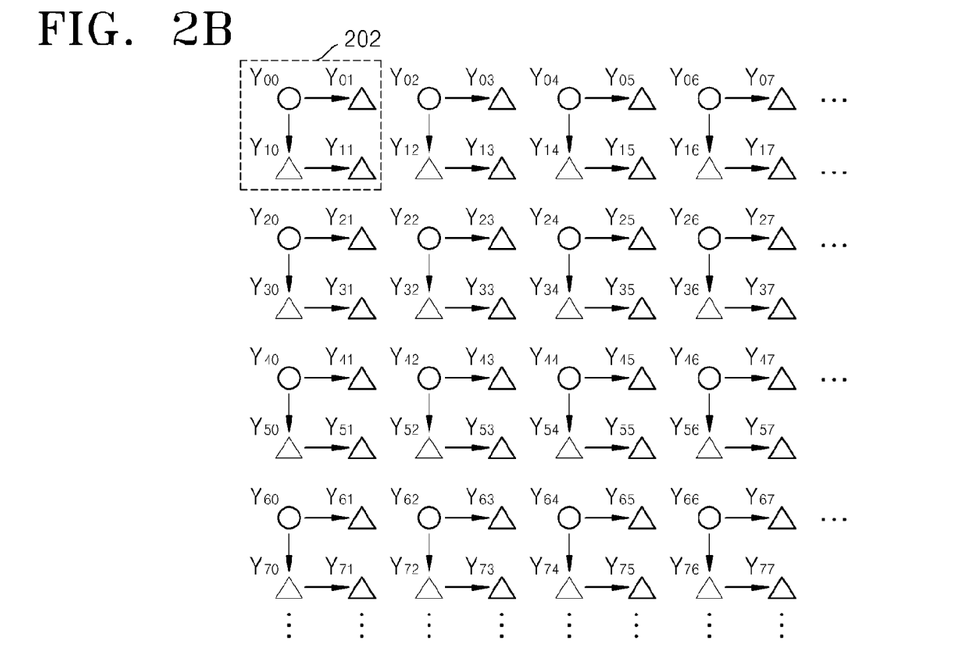

FIG. 2B shows 16 pixel blocks, each pixel block having a size of 2 pixels×2 pixels.

For a pixel block 202 located at the left uppermost corner, Y00 indicated by a circle denotes a reference pixel, and Y01, Y10, and Y11 indicated by a triangle denote neighboring pixels. An arrow marked in a direction from Y10 to Y11 indicates that a pixel value of Y11 is replaced with a difference value between a pixel value of Y10 and the pixel value of Y11. That is, the exemplary embodiment of FIG. 2B indicates that a pixel difference value of the neighboring pixel Y11 may be generated by referring to another neighboring pixel Y10 without referring the reference pixel Y00. Accordingly, a receiver must use a restored pixel value of the neighboring pixel Y10 after first restoring the pixel value of the neighboring pixel Y10 in order to restore the pixel value of the neighboring pixel Y11.

In the pixel block 202 located at the left uppermost corner of FIG. 2B, a pixel value of the reference pixel Y00 may be included in a first packet, a pixel value of the neighboring pixel Y01 may be included in a second packet, the pixel value of the neighboring pixel Y10 may be included in a third packet, and the pixel value of the neighboring pixel Y11 may be included in a fourth packet. In the 15 remaining pixel blocks in FIG. 2B, pixel values and pixel difference values of pixels are allocated to packets in the same way as that in the pixel block 202 located at the left uppermost corner of FIG. 2B. For example, pixel values of reference pixels Y00, Y02, Y04, Y06, . . . , Y66, . . . may be included in a first packet, pixel difference values of neighboring pixels Y01, Y03, Y05, Y07, . . . , Y67, . . . may be included in a second packet, pixel difference values of neighboring pixels Y10, Y12, Y14, Y16, . . . , Y76, . . . may be included in a third packet, and pixel difference values of neighboring pixels Y11, Y13, Y15, Y17, . . . , Y77, . . . may be included in a fourth packet.

The packets may be generated in the order of the first packet, the second packet, the third packet, and the fourth packet according to importance of the packets. That is, since the most important packet is the first packet including reference pixels when a receiver receives the packets, the first packet may be generated first, and since neighboring pixels included in the fourth packet are restorable after neighboring pixels included in the third packet are restored, the fourth packet is least important and thus is generated last.

According to another exemplary embodiment, unequal error protection may be applied to packets according to importance of the packets.

That is, in the prior exemplary embodiment, the strongest error protection may be applied to the first packet, and the weakest error protection may be applied to the fourth packet. For example, the number of bits allocated to packets for error correction may be large in the order of the first packet, the second packet, the third packet, and the fourth packet.

Figure 2C:
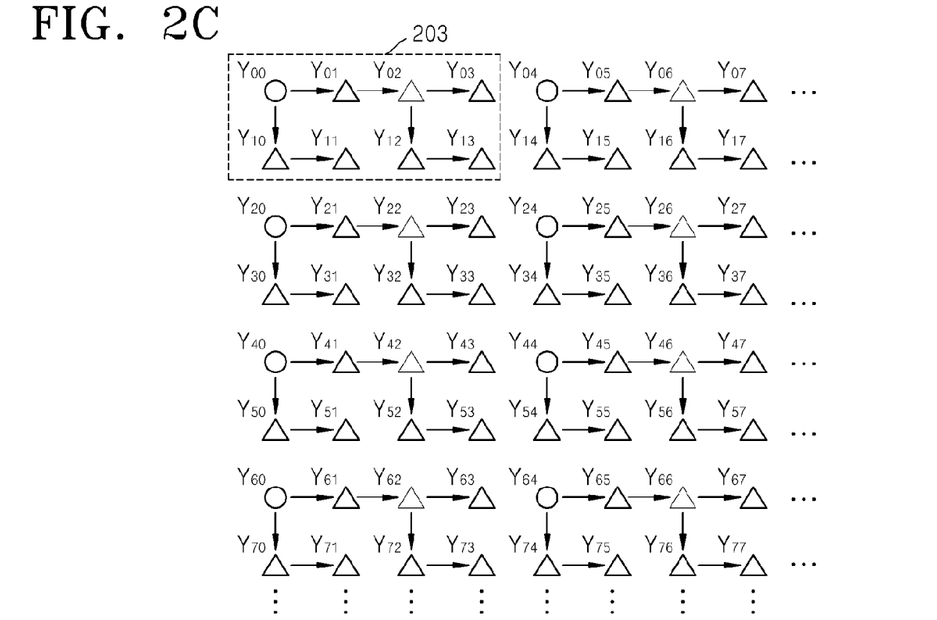

FIG. 2C shows 8 pixel blocks, each pixel block having a size of 2 pixels×4 pixels.

For a pixel block 203 located at the left uppermost corner, Y00 indicated by a circle denotes a reference pixel, and Y01, Y02, Y03, Y10, Y11, Y12, and Y13 indicated by a triangle denote neighboring pixels.

In the pixel block 203 located at the left uppermost corner in the embodiment of FIG. 2C, a pixel value of the reference pixel Y00 and pixel difference values of the neighboring pixels Y01, Y02, Y03, Y10, Y11, Y12, and Y13 are included in 8 different packets according to their positions in the pixel block 203 as described above. In the 7 remaining pixel blocks in FIG. 2C, pixel values and pixel difference values of pixels are allocated to packets in the same way as that in the pixel block 203 located at the left uppermost corner of FIG. 2C.

Figure 2D:
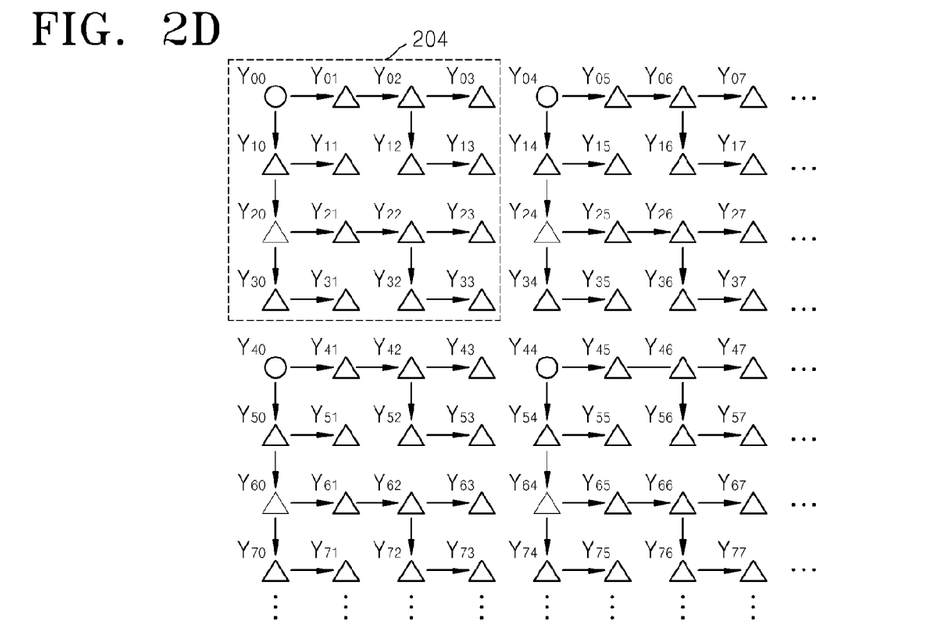

FIG. 2D shows 4 pixel blocks, each pixel block having a size of 4 pixels×4 pixels.

In a pixel block 204 located at the left uppermost corner of FIG. 2D, a pixel value of a reference pixel Y00 and pixel difference values of 15 neighboring pixels Y01 to Y33 are included in 16 different packets according to their positions in the pixel block 204. In the 3 remaining pixel blocks in FIG. 2D, pixel values and pixel difference values of pixels are allocated to packets in the same way as that in the pixel block 204 located at the left uppermost corner of FIG. 2D.

Figure 2E:
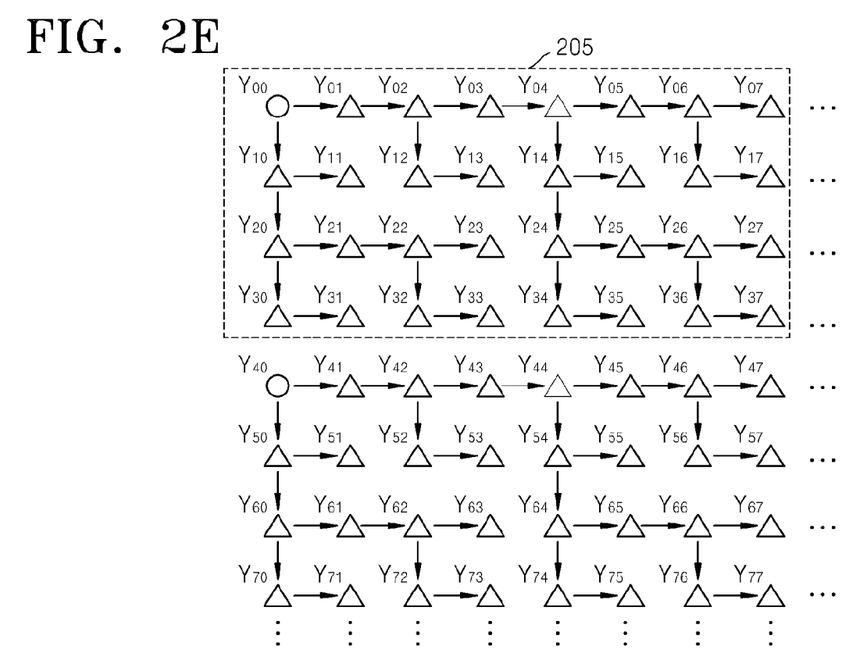

FIG. 2E shows 2 pixel blocks, each pixel block having a size of 4 pixels×8 pixels.

In a pixel block 205 located at the left uppermost corner of FIG. 2E, a pixel value of a reference pixel Y00 and pixel difference values of 31 neighboring pixels Y01 to Y37 are included in 32 different packets according to their positions in the pixel block 205. In the remaining pixel block in FIG. 2E, a pixel value of a reference pixel and pixel difference values of neighboring pixels are allocated to packets in the same way as that in the pixel block 205 located at the left uppermost corner of FIG. 2E.

Figure 2F:
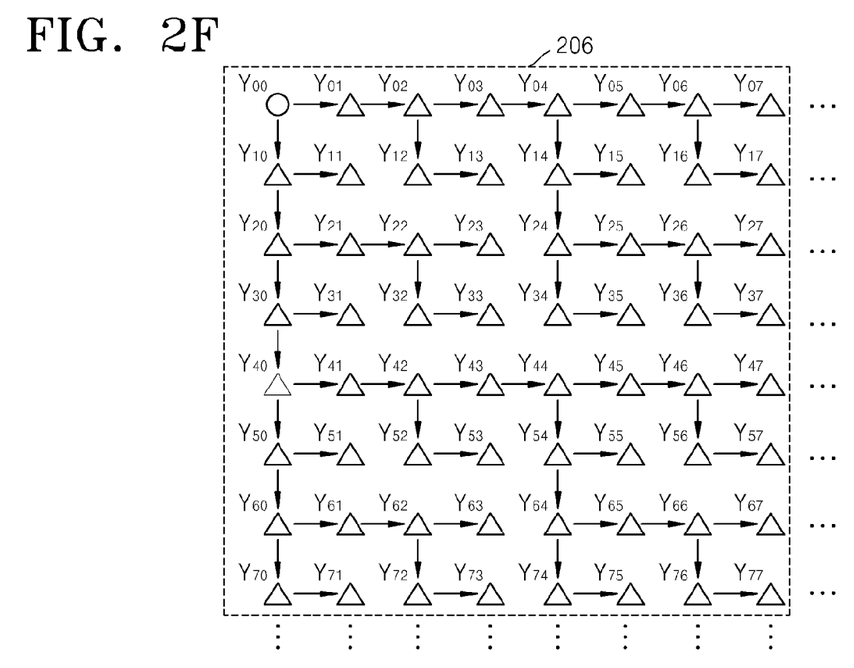

FIG. 2F shows 1 pixel block 206 having a size of 8 pixels×8 pixels.

In the pixel block 206 of FIG. 2F, a pixel value of a reference pixel Y00 and pixel difference values of 63 neighboring pixels Y01 to Y77 are included in 64 different packets according to their positions in the pixel block 206.

Although a position of a reference pixel is located at the left uppermost corner of each pixel block in FIGS. 2A to 2F, the exemplary embodiments not limited thereto. For example, a position of a reference pixel may be located at the right uppermost corner of each pixel block.

Figure 3:
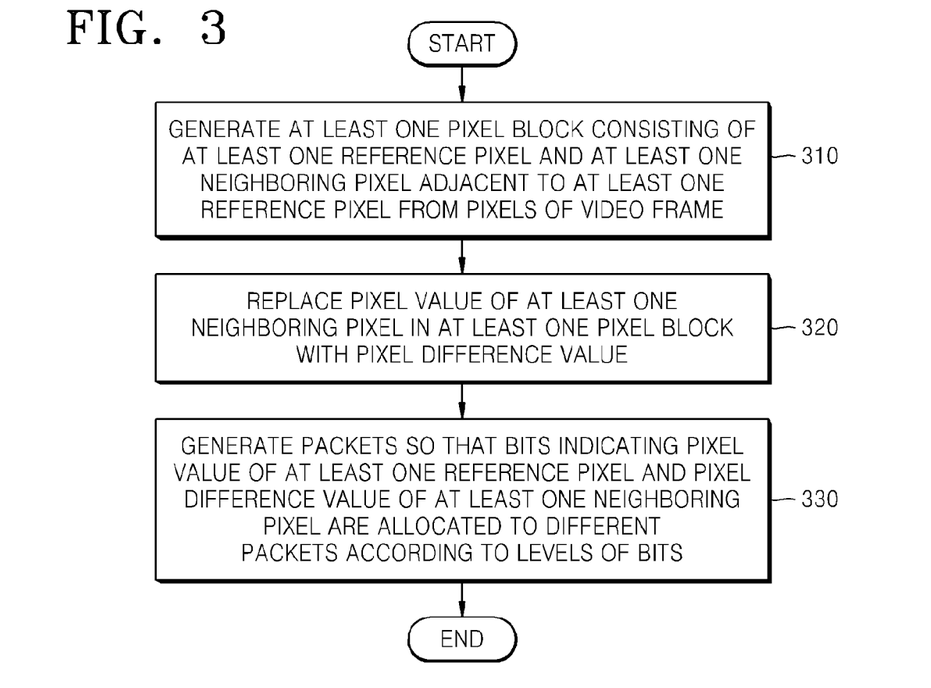
FIG. 3 is a flowchart of a method of generating a video packet according to another exemplary embodiment.

FIG. 3 is a flowchart of a method of generating a video packet according to another exemplary embodiment.

In operation 310, at least one pixel block consisting of at least one reference pixel and at least one neighboring pixel adjacent to the at least one reference pixel is generated from pixels of a video frame.

In operation 320, a pixel value of the at least one neighboring pixel in the at least one pixel block is replaced with a pixel difference value, which is a difference value between a pixel value of one of the pixels adjacent to the at least one neighboring pixel and the pixel value of the at least one neighboring pixel.

In operation 330, packets are generated so that bits respectively indicating a pixel value of the at least one reference pixel and the pixel difference value of the at least one neighboring pixel are allocated to different packets according to levels of the bits.

The method illustrated in FIG. 3 is described in more detail with reference to FIG. 4.

Figure 4:
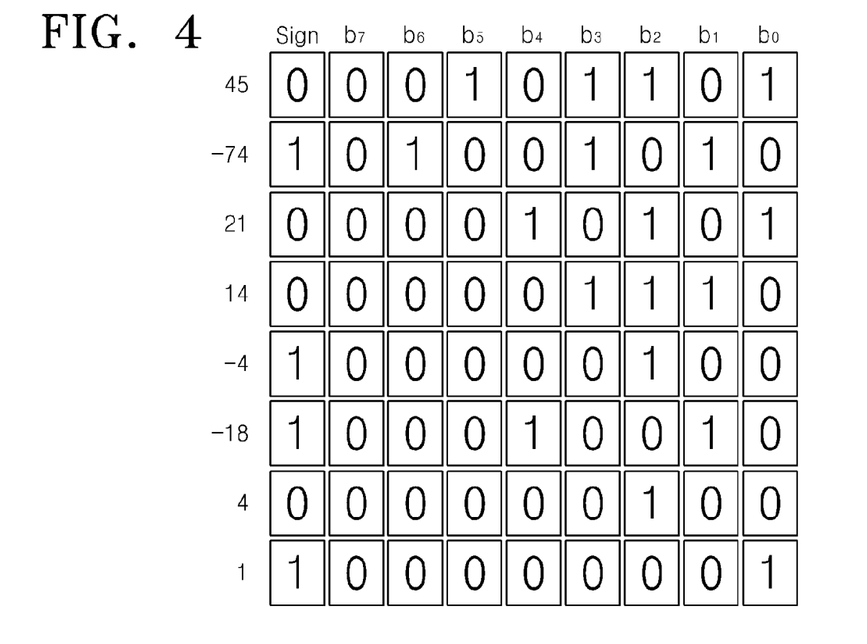
FIG. 4 is a diagram for describing bits indicating pixel difference values of neighboring pixels, according to an exemplary embodiment.

FIG. 4 is a diagram for describing bits indicating pixel difference values of neighboring pixels, according to an exemplary embodiment.

Referring to FIG. 4, when pixel difference values of neighboring pixels are 45, −74, 21, 14, −4, −18, 4, and −1, the pixel difference values of the neighboring pixels are indicated with 9 bits as binary numbers, such as 000101101, 101001010, 000010101, 000001110, 100000100, 100010010, 000000100, and 100000001, respectively.

As such, if pixel difference values of neighboring pixels are indicated with 9 bits including a sign value, binary values of each set of 9 bits may be allocated to 9 different packets. In addition, if a pixel value of a reference pixel is indicated with 9 bits including a positive (+) sign value, binary values of the 9 bits indicating the pixel value of the reference pixel may be allocated to 9 different packets.

Figure 5:
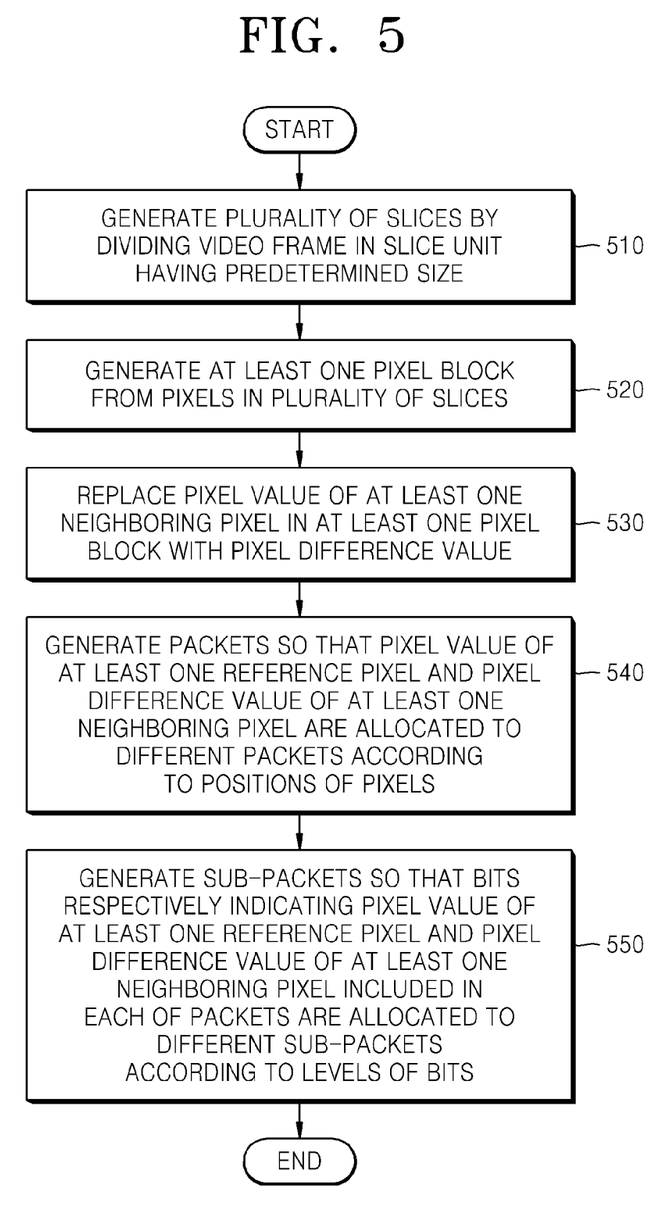
FIG. 5 is a flowchart of a method of generating a video packet according to another exemplary embodiment.

FIG. 5 is a flowchart of a method of generating a video packet according to another exemplary embodiment.

Referring to FIG. 5, in operation 510, a plurality of slices are generated by dividing a video frame in a slice unit having a predetermined size.

For example, the video frame may be divided in a video slice unit having an 8-pixel size in a vertical direction.

In operation 520, at least one pixel block consisting of at least one reference pixel and at least one neighboring pixel adjacent to the at least one reference pixel is generated from pixels of the plurality of slices.

In operation 530, a pixel value of the at least one neighboring pixel in the at least one pixel block is replaced with a pixel difference value, which is a difference value between a pixel value of one of pixels adjacent to the at least one neighboring pixel and the pixel value of the at least one neighboring pixel.

In operation 540, packets are generated so that a pixel value of the at least one reference pixel and the pixel difference value of the at least one neighboring pixel are allocated to different packets according to positions of the pixels.

In operation 550, sub-packets are generated so that bits respectively indicating the pixel value of the at least one reference pixel and the pixel difference value of the at least one neighboring pixel included in each of the packets are allocated to different sub-packets according to levels of the bits.

The exemplary embodiment of FIG. 5 is a combination of the exemplary embodiment of FIG. 1 and the exemplary embodiment of FIG. 3. Accordingly, the number of sub-packets generated in the exemplary embodiment of FIG. 5 is greater than the number of packets generated in each of the exemplary embodiments of FIGS. 1 and 3.

For example, when a pixel block has a size of 2 pixels×2 pixels, a packet for a reference pixel and 3 packets for 3 neighboring pixels are generated. And if the number of bits indicating a pixel value of the reference pixel and a pixel difference value of each of the neighboring pixels is 9 including a sign value, since 9 sub-packets are generated for each of the 4 generated packets, a total of 36 sub-packets are generated.

Figure 6:
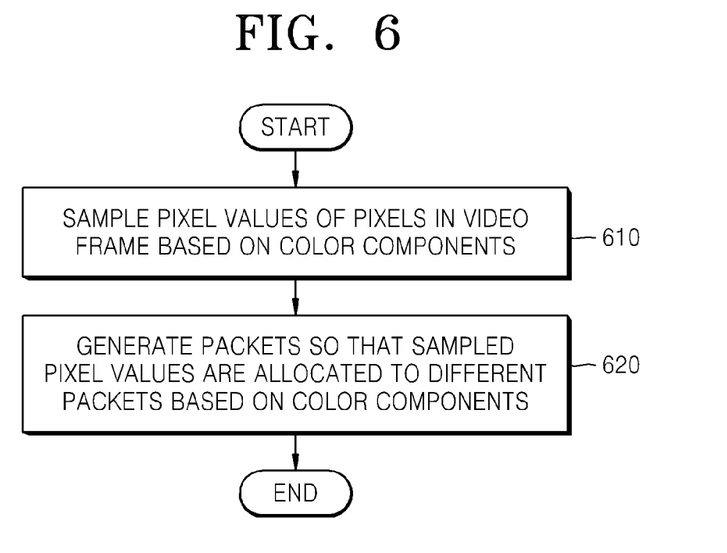
FIG. 6 is a flowchart of a method of generating a video packet according to another exemplary embodiment.

FIG. 6 is a flowchart of a method of generating a video packet according to another exemplary embodiment.

Referring to FIG. 6, in operation 610, pixel values of pixels in a video frame are sampled based on color components.

For example, pixel values of pixels may be sampled as a red (R) component, a green (G) component, and a blue (B) component, as a luma (Y) component, a chroma (U) component, and another chroma (V) component, or as a luma (Y) component, a blue-difference chroma (Cb) component, and a red-difference chroma (Cr) component. However, the exemplary embodiments are not limited thereto, and color components may be sampled in various combinations. For example, pixel values of pixels may be sampled as combinations of 6 color components, such as Y0Y1, Y2Y3, U0V0, U2V2, U1V1, and U3V3.

In operation 620, packets are generated so that the sampled pixel values are allocated to different packets based on the color components.

For example, when pixel values of pixels are sampled as an R component, a G component, and a B component, a pixel value of the R component may be allocated to a first packet, a pixel value of the G component may be allocated to a second packet, and a pixel value of the B component may be allocated to a third packet.

Figure 7:
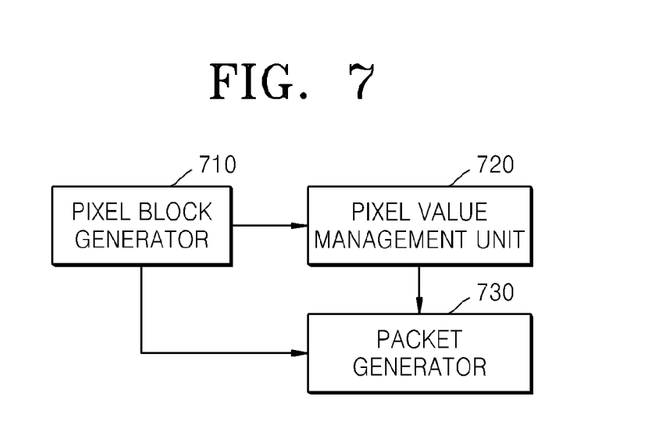
FIG. 7 is a block diagram of an apparatus for generating a video packet according to an exemplary embodiment.

FIG. 7 is a block diagram of an apparatus for generating a video packet according to an exemplary embodiment.

Referring to FIG. 7, the apparatus includes a pixel block generator 710, a pixel value management unit 720, and a packet generator 730.

The pixel block generator 710 generates at least one pixel block consisting of at least one reference pixel and at least one neighboring pixel adjacent to the at least one reference pixel from pixels of a video frame.

According to another exemplary embodiment, the pixel block generator 710 may generate a plurality of slices by dividing a video frame in a slice unit having a predetermined size and generate at least one pixel block from pixels of the plurality of slices.

The pixel value management unit 720 replaces a pixel value of the at least one neighboring pixel in the at least one pixel block with a pixel difference value, which is a difference value between a pixel value of one of pixels adjacent to the at least one neighboring pixel and the pixel value of the at least one neighboring pixel.

The packet generator 730 generates packets so that a pixel value of the at least one reference pixel and the pixel difference value of the at least one neighboring pixel are allocated to different packets according to positions of the pixels.

According to another exemplary embodiment, the packet generator 730 may generate packets so that bits respectively indicating the pixel value of the at least one reference pixel and the pixel difference value of the at least one neighboring pixel are allocated to different packets or different sub-packets according to levels of the bits.

The apparatus may further include a coder (not shown) for performing entropy coding of packets of neighboring pixels from among the packets generated by the packet generator 730.

Although the entropy coding is used to reduce the capacity of packets, various coding schemes for reducing the capacity of packets may be applied to the packets besides the entropy coding.

Figure 8:
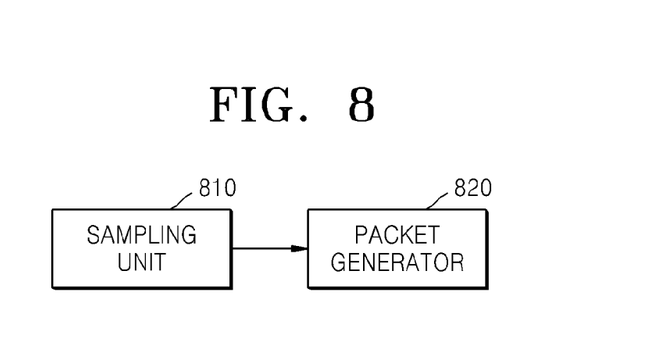
FIG. 8 is a block diagram of an apparatus for generating a video packet according to another exemplary embodiment.

FIG. 8 is a block diagram of an apparatus for generating a video packet according to another exemplary embodiment.

Referring to FIG. 8, the apparatus includes a sampling unit 810 and a packet generator 820.

The sampling unit 810 samples pixel values of pixels in a video frame based on color components.

The packet generator 820 generates packets so that the sampled pixel values are allocated to different packets based on the color components.

The exemplary embodiments can be written as computer programs encoded on a computer readable recording medium and can be implemented in general-use digital computers that execute the programs using the computer readable recording medium. Examples of the computer readable recording medium include magnetic storage media (e.g., ROM, floppy disks, hard disks, etc.) and optical recording media (e.g., CD-ROMs or DVDs).

Although certain exemplary embodiments have been shown and described herein, it will be understood by those of ordinary skill in the art that various changes in form and details may be made therein without departing from the spirit and scope of the general inventive concept. The exemplary embodiments should be considered in a descriptive sense only and not for purposes of limitation. Therefore, the scope of the general inventive concept is defined not by the detailed description but by the appended claims and their equivalents, and all differences within the scope will be construed as being included in the general inventive concept.

What is claimed is:

1. A method of generating a video packet, the method comprising:
    generating at least one pixel block comprising at least one reference pixel and at least one neighboring pixel adjacent to the at least one reference pixel from among a plurality of pixels of a video frame;
    replacing a pixel value of the at least one neighboring pixel in the at least one pixel block with a pixel difference value, which is a difference value between a pixel value of a pixel adjacent to the at least one neighboring pixel and the pixel value of the at least one neighboring pixel; and
    generating a plurality of packets so that a pixel value of the at least one reference pixel and the pixel difference value of the at least one neighboring pixel are allocated to different packets among the plurality of packets according to positions of the at least one reference pixel and the at least one neighboring pixel within the at least one pixel block.

2. The method of claim 1, wherein the generating of the plurality of packets further comprises generating a plurality of sub-packets so that bits respectively indicating the pixel value of the at least one reference pixel and the pixel difference value of the at least one neighboring pixel, which are respectively included in the plurality of packets, are allocated to different sub-packets among the plurality of sub-packets according to a level of the bits.

3. The method of claim 1, further comprising performing entropy coding of at least one packet including the pixel difference value of the at least one neighboring pixel from among the generated plurality of packets.

4. The method of claim 1, wherein the generating the plurality of packets comprises generating the plurality of packets to which unequal error protection is applied according to an importance of the plurality of packets.

5. The method of claim 1, wherein the generating the plurality of packets comprises generating the plurality of packets in an order of importance of the plurality of packets.

6. The method of claim 1, further comprising determining a size of the at least one pixel block,
    wherein the at least one pixel block is generated based on the size of the pixel block.

7. The method of claim 1, further comprising generating a plurality of slices having a predetermined size by dividing the video frame in a slice unit,
    wherein the generating of the at least one pixel block is performed for pixels in the plurality of slices.

8. A method of generating a video packet, the method comprising:
    generating at least one pixel block comprising of at least one reference pixel and at least one neighboring pixel adjacent to the at least one reference pixel from among a plurality of pixels of a video frame;
    replacing a pixel value of the at least one neighboring pixel in the at least one pixel block with a pixel difference value, which is a difference value between a pixel value of a pixel adjacent to the at least one neighboring pixel and the pixel value of the at least one neighboring pixel; and
    generating a plurality of packets so that bits respectively indicating a pixel value of the at least one reference pixel and the pixel difference value of the at least one neighboring pixel are allocated to different packets among the plurality of packets according to a level of the bits.

9. A method of generating a video packet, the method comprising:
    sampling pixel values of a plurality of pixels in a video frame based on color components; and
    generating a plurality of packets so that the sampled pixel values are allocated to different packets among the plurality of packets based on the color components.

10. An apparatus for generating a video packet, the apparatus comprising:
    a pixel block generator which generates at least one pixel block comprising of at least one reference pixel and at least one neighboring pixel adjacent to the at least one reference pixel from among a plurality of pixels of a video frame;
    a pixel value management unit which replaces a pixel value of the at least one neighboring pixel in the at least one pixel block with a pixel difference value, which is a difference value between a pixel value of a pixel adjacent to the at least one neighboring pixel and the pixel value of the at least one neighboring pixel; and
    a packet generator which generates a plurality of packets so that a pixel value of the at least one reference pixel and the pixel difference value of the at least one neighboring pixel are allocated to different packets among the plurality of packets according to positions of the at least one reference pixel and the at least one neighboring pixel within the at least one pixel block.

11. The apparatus of claim 10, wherein the packet generator further generates a plurality of sub-packets so that bits respectively indicating the pixel value of the at least one reference pixel and the pixel difference value of the at least one neighboring pixel, which are respectively included in the plurality of packets, are allocated to different sub-packets among the plurality of sub-packets according to a level of the bits.

12. The apparatus of claim 10, further comprising a coder for performing entropy coding of at least one packet including the pixel difference value of the at least one neighboring pixel from among the generated plurality of packets.

13. The apparatus of claim 10, wherein the packet generator generates the plurality of packets to which unequal error protection is applied according to an importance of the plurality of packets.

14. The apparatus of claim 10, wherein the packet generator generates the plurality of packets in an order of importance of the plurality of packets.

15. The apparatus of claim 10, wherein the pixel block generator determines a size of the at least one pixel block and generates the at least one pixel block based on the size of the pixel block.

16. The apparatus of claim 10, wherein the pixel block generator generates a plurality of slices having a predetermined size by dividing the video frame in a slice unit and generates the at least one pixel block from pixels in the plurality of slices.

17. An apparatus for generating a video packet, the apparatus comprising:
a pixel block generator which generates at least one pixel block comprising of at least one reference pixel and at least one neighboring pixel adjacent to the at least one reference pixel from among a plurality of pixels of a video frame;
a pixel value management unit which replaces a pixel value of the at least one neighboring pixel in the at least one pixel block with a pixel difference value, which is a difference value between a pixel value of a pixel adjacent to the at least one neighboring pixel and the pixel value of the at least one neighboring pixel; and
a packet generator which generates a plurality of packets so that bits respectively indicating a pixel value of the at least one reference pixel and the pixel difference value of the at least one neighboring pixel are allocated to different packets among the plurality of packets according to a level of the bits.

18. An apparatus for generating a video packet, the apparatus comprising:
a sampling unit which samples pixel values of pixels in a video frame based on color components; and
a packet generator which generates a plurality of packets so that the sampled pixel values are allocated to different packets among the plurality of packets based on color components.

19. A non-transitory computer-readable recording medium storing a computer-readable program for executing the method of claim 1.

20. A method of generating a video packet, the method comprising:
generating a first pixel block comprising a first reference pixel and at least one first neighboring pixel;
replacing a pixel value of each of the at least one first neighboring pixel with a first pixel difference value, wherein each first pixel difference value is calculated by selecting a first neighboring pixel from among the at least one first neighboring pixel, selecting a first pixel adjacent to the selected first neighboring pixel, and calculating a difference value between a pixel value of the first pixel adjacent to the selected first neighboring pixel and a pixel value of the selected first neighboring pixel; and
generating a plurality of packets such that a different packet among the plurality of packets is generated for each pixel in the pixel block.

21. The method of claim 20, wherein the generating of the plurality of packets comprises allocating a pixel value of the first reference pixel and each first pixel difference value to different packets among the plurality of packets according to positions within the pixel block of the first reference pixel and the at least one first neighboring pixel.

22. The method of claim 21, further comprising:
generating a second pixel block comprising a second reference pixel and at least one second neighboring pixel, wherein the second pixel block has a same pixel arrangement as the first pixel block;
replacing a pixel value of each of the at least one second neighboring pixel with a second pixel difference value, wherein each second pixel difference value is calculated by selecting a second neighboring pixel from among the at least one second neighboring pixel, selecting a second pixel adjacent to the selected second neighboring pixel, and calculating a second difference value between a pixel value of the second pixel adjacent to the selected second neighboring pixel and a pixel value of the selected second neighboring pixel; and
allocating a pixel value of the second reference pixel and each second pixel difference value to different packets among the plurality of packets according to positions within the second pixel block of the second reference pixel and the at least one second neighboring pixel.

23. The method of claim 22, wherein the pixels of the first and second pixel blocks having a same corresponding position are allocated to a same packet among the plurality of packets, and the pixels of the first and second pixel blocks having different corresponding positions are allocated to different packets among the plurality of packets.

* * * * *